UNITED STATES PATENT OFFICE.

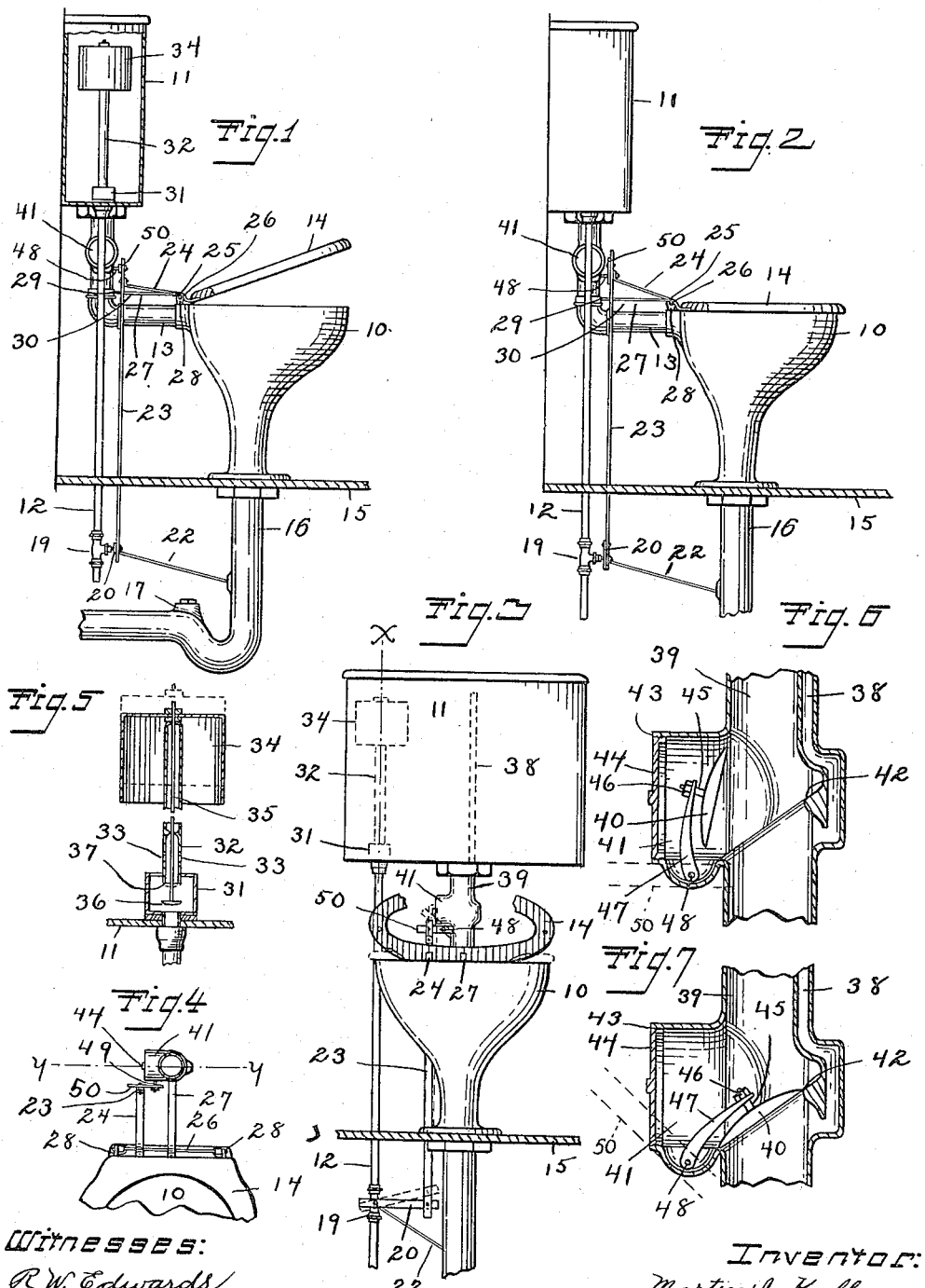

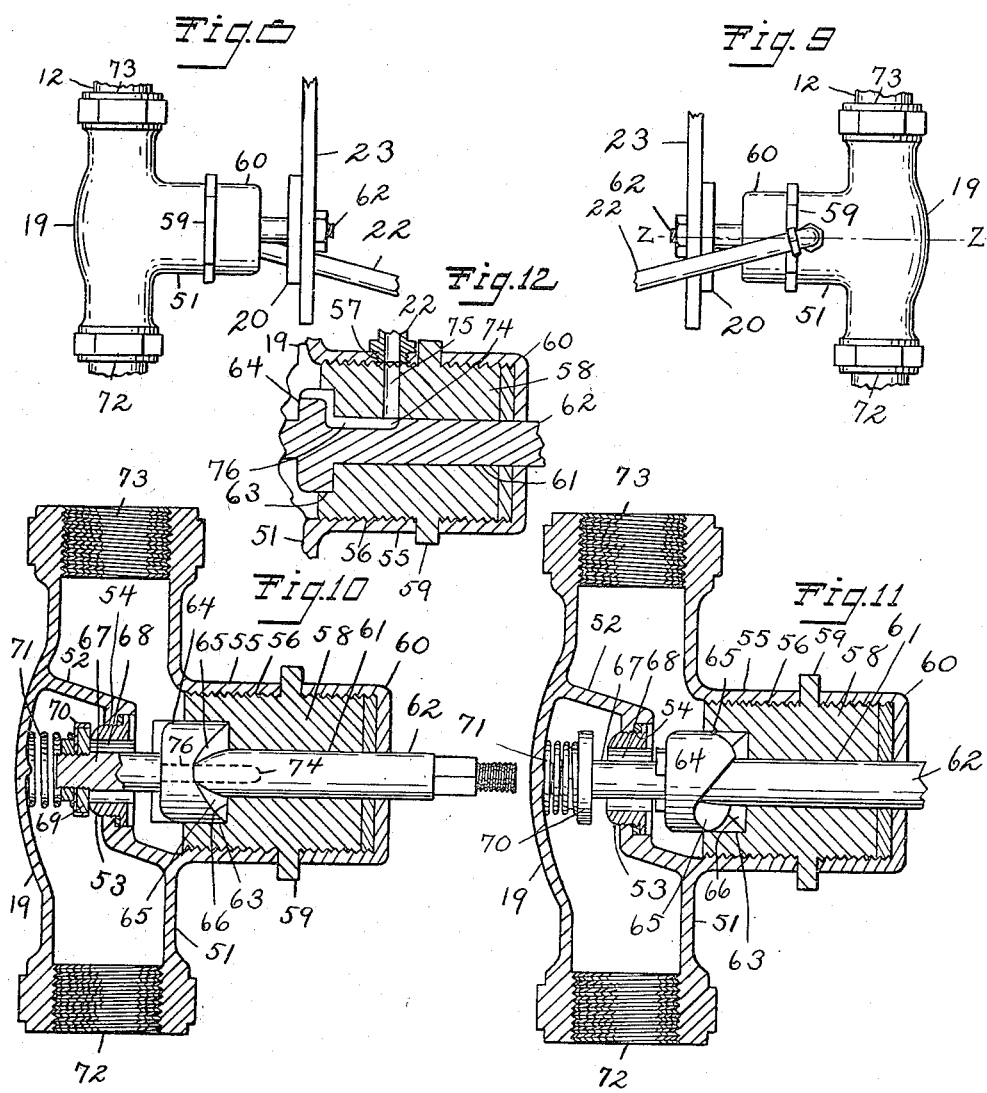

MARTIN J. KELLY, OF NEW BRITAIN, CONNECTICUT.

WATER-CLOSET DEVICE.

1,215,816.

Specification of Letters Patent.

Patented Feb. 13, 1917.

Application filed February 25, 1915. Serial No. 10,428.

*To all whom it may concern:*

Be it known that I, MARTIN J. KELLY, a citizen of the United States, residing at New Britain, in the county of Hartford and State of Connecticut, have invented certain new and useful Improvements in Water-Closet Devices, of which the following is a specification.

My invention relates to improvements in water closet devices, and the object of my improvement is simplicity and economy in construction and convenience and efficiency in use.

In the accompanying drawing:—

Figure 1 is a side elevation of my improved water closet device.

Fig. 2 is a similar view of the same with the parts in a different position.

Fig. 3 is a front elevation of the same with the parts in the position shown in Fig. 1.

Fig. 4 is a plan view of part of the same.

Fig. 5 is a sectional view on an enlarged scale on the line x x of Fig. 3.

Fig. 6 is a sectional view on the line y y of Fig. 4.

Fig. 7 is a similar view with the parts in a different position.

Fig. 8 is a side elevation on a considerably enlarged scale of the cock shown in Fig. 1, and adjacent parts.

Fig. 9 is an elevation of the other side of the same.

Fig. 10 is a sectional view on an enlarged scale of the same.

Fig. 11 is a similar view of the same with the parts in a different position.

Fig. 12 is a fragmentary sectional view on the line z z of Fig. 9.

My improved water closet device comprises a bowl 10 having a seat 14 at the upper end and a reduced extension at the lower end, the said extension passing through the floor 15 and connecting with the outlet pipe 16, and in combination with the said bowl a tank 11, a supply pipe 12 that also passes through the floor 15 and leads to the tank 11, a delivery pipe 13 connecting the tank 11 with the bowl 10, and controlling devices operative normally to hold the seat 14 tilted, as shown in Fig. 1, and when the seat is so tilted to connect the tank 11 and the portion of the supply pipe 12 that is above the floor 15 with the said outlet pipe 16, preferably above the trap 17.

The said extension connects with the trap 17, the latter being below the floor 15 as shown, and there is no water retained in the bowl 10 or extension above the trap 17.

Accordingly, there is normally no water in the device above the floor 15.

When in position for use, with the seat 14 closed on the bowl 10, as shown in Fig. 2, a limited supply of water is admitted to the tank 11, and when the seat 14 is again tilted to the position shown in Fig. 1 this water is drained from the tank, the major part of the same passing through the bowl 10.

The mechanism for effecting these results is as follows:—

The supply pipe 12 is provided with a cock 19 positioned below the floor 15 which is spring controlled, of any approved construction, operated by a crank arm 20, and which operates normally, when in the position shown in Fig. 1 to close the supply pipe and at the same time opens a passage connecting the portion of the supply pipe 12 above the cock 19 with the extension through the drain lead 22. When in the position for use, shown in Fig. 2, the main passage of the cock 19 is open, admitting water to the tank 11, and the drain connection 22 is closed.

The operation of the cock 19 conforms to that of the seat 10, the two being connected by means of the vertical connecting rod 23 passing through the floor 15, connected at the lower end to the crank arm 20, the upper end being connected to the rear end of a lever 24.

The lever 24 is fulcrumed at 25, the front end thereof being in bearing engagement with the lower side of the seat 14.

The hinge 28 for the seat 14 is preferably of the bar type, and bar 26 thereof serves as the fulcrum 25 for the lever 24, the said lever 24 passing over the said hinge bar 26 and being in sliding bearing engagement therewith. The front end thereof is bent suitably to pass under the seat 14 and to be in bearing engagement therewith.

Accordingly, as the seat 14 is raised and lowered the cock 19 is moved from one to the other of its limiting positions.

The tilting of the seat 14 is effected by any suitable spring 27, that shown being of flat spring material, passing over the bar 26 of the hinge 28, generally after the manner of the lever 24, and also in a similar manner engaging by the front end with the under side of the seat 14. The rear end of the spring 27 is fixedly secured in some manner, to some part of the structure of the delivery pipe 13.

Accordingly, the rear portion of the spring 27 is essentially rigidly secured between the said rear end 29 and the bar 25, and the front portion in front of the bar 25 is free to move responsive to movements of the seat 14, the said front portion being forced downwardly when the seat is in position of use and serving to tilt the seat 14 when the seat is free.

The means provided for filling the tank 11 are as follows:

At the bottom of the tank is a valve chamber 31, which receives the upper end of the supply pipe 12. A tube 32 passes through the upper wall of the valve casing 13 and extends upwardly into the body of the tank 11. Side passages 33 just above the chamber 31 admit water from the tube 32 to the body of the tank 11.

A float in the form of a hood incloses the upper part of the tube 32, and is connected by a valve stem 35, passing through the tube 32 with a valve 36 within the chamber 31, suitable for engaging with the lower end 37 of the tube 32, the said lower end 37 serving as a valve seat in coöperation with the said valve 36.

As the water enters the tank 11 and rises therein the hood 34 is raised until the proper amount of water has been admitted when the valve 36 closes against the seat 37, due to the raising of the hood 34. When the water is run off the hood 34 falls and the valve 36 opens, permitting air to enter the upper part of the supply pipe 12, so that the water can drain therethrough.

The delivery pipe 13 is provided at the upper end with a branch 38 that is open at the upper end and extends upwardly in the tank 11 to the desired height to serve as an overflow pipe and a branch 39 that serves as the delivery line proper, connected to the bottom of the tank 11, and there is provided just below the junction of the branches 38 and 39 a trap valve 40 for controlling the delivery from the tank 11 to the bowl 10 and which is operatively connected to the seat 14. The connecting rod 23 serving as the particular connection means as shown.

The trap valve 40 is housed in a valve chamber 41, the valve 40 engaging with an angularly disposed seat 42 in the chamber 41.

An outlet 43 closed by a screw plug 44 permits of access to the valve 40 and seat 42.

The valve 40 is disk-shaped, and is provided at the upper side with a valve stem 45 by which it is mounted, as by a nut 46, on a crank arm 47 mounted on the shaft 48. One end of the shaft 38 extends through the side wall of the valve chamber 41, as shown at 49. On the end 49 is a second crank arm 50 that serves as an operating handle or arm which is connected to the connecting rod 23 suitably to be operated thereby.

Accordingly, the connecting rod 23 serves to connect the seat 14 with the cock 19 for controlling the water supply and the draining of the supply pipe, and with the trap valve 40 for controlling the delivery from the tank 11 to the bowl 10, and these parts are normally under the control of the spring 27.

The connections of the connecting rod 23 with the crank arm 20 of the cock 19 and with the crank arm 50 of the valve 40 serve to position the connecting rod 23 so that as the connecting rod 23 is raised and lowered there is a slight lateral movement thereof, and in order to permit such movement freely the lever 24, which is also connected to the connecting rod 23, as described, is operatively connected with the hinge bar 26 and the seat 14 by means permitting of the necessary slight lateral or longitudinal movement, such connections being essentially floating.

Thus the connection with the seat consists of simply a bearing contact between the free end of the lever and the opposed face of the seat, and the contact between the lever and the hinge bar consists of a bearing contact of one face of the lever with the opposed face of the hinge bar. Both of these connections permit of a slight, relative sliding movement, and permit the connecting rod to move freely laterally to the extent required, and without affecting the essential operative features of the parts.

In the arrangement shown and described there is no water in any part of the device above the floor under normal conditions, when the seat is tilted. After the seat has been brought from the tilted position to the position for use, in which it is horizontal, and engaged with the bowl, the properly limited amount of water is admitted to the tank. After the seat has been brought back to the tilted position again, which is effected by the spring as described this water is all run off and delivered to the outlet system, so that none remains above the floor, the connections to the tank being so arranged that there will be no accumulation or residue of water there, or in other words, so that there will be a thorough and complete drainage of water therefrom.

Accordingly, my device, as described, is suitable for use in exposed positions, the mechanism below the floor being provided with suitable insulation or protection to correspond to the particular conditions.

In detail the cock 19 comprises a casing body 51 provided with an interior division wall 52 having an opening provided with a valve seat member 53, which latter as shown is removable, being secured to the wall 52 by a screw threaded connection 54.

The casing also has a neck 55 in alinement with the axis of the valve seat member 53 which has an interior screw thread 56, and which has also a lateral opening 57 in the side wall to which is connected the drain pipe 22.

The neck 55 is essentially filled by a plug 58 that has an annular flange 59 at about the middle of the length, and which is screw threaded on the periphery below and above the said flange 59. The lower screw threaded portion is engaged with the threaded interior 56 of the neck 55, the flange 59 resting on the end of the neck 55, and the upper threaded portion receiving the cap 60.

The plug 58 has a bore 61 extending from the upper end downwardly for the greater part of the length for operatively housing the valve stem 62 and at the end has a cavity 63 in which is housed a cam 64 in the form of an enlargement on the said stem 62, and which has end cam faces 65 on the upper side.

The opposed portion of the cavity 63 of the bore constituting the end wall of the same has coöperating end cam faces 66.

Below the cam enlargement 64 there is an extension 67 of the stem 62 which extends through the opening 68 in the valve seat member 53 and which has mounted at the lower portion a valve 69, suitable for coöperating with the valve 70 at the lower end of the valve seat member 53.

A spring 71 engages with the valve 70 and tends to hold the same on its seat, and to hold the valve stem 62 and connected parts, including the cam 64 in the elevated position.

Turning the valve stem 62 serves to operate the cam faces 65 and 66 and thereby depress and open the valve 70.

The inlet of the supply pipe is connected to the end 72 of the casing 51 on the side of the bridge 50 that is remote from the cam 64 and vent drainage outlet 57, and the end 73 on the same side as the same cam and opening is connected to the tank. A connection between the vent opening 57 and the interior of the casing 51 is provided in the form of a passage designated generally by the character 74. The said passage 74 is made up of parts that are normally connected in series comprising the hole 75 in the plug 58 and the groove 76 that leads therefrom along the periphery of the valve stem 62 and the cam 64.

Turning the valve stem 62 brings the channel or groove 76 out of registration with the hole 75 and thereby serves to close the vent channel.

I claim as my invention:—

1. In a water closet device, a bowl, a seat, a hinge connecting the said bowl and seat and having a horizontal hinge bar, a spring tending to tilt the said seat, an inlet pipe having a cock controlled by a lever, a flushing pipe having a flushing valve controlled by a lever, a connecting rod interconnecting the said levers, and an operating lever connected by one end to the said connecting rod, having the other end engaged with one face of the said seat and having sliding bearing engagement intermediate the said ends on one side of the said hinge bar.

2. In a water closet device, a bowl, a flushing connection connecting the water tank with the said bowl and having an enlarged portion serving as a valve chamber, the said enlarged portion having a valve seat, a swinging valve for coöperating with the said seat, a closet seat hinged to the said bowl, a spring tending to tilt the said closet seat relatively to the said bowl, means operatively connecting the said closet seat and valve, and the said valve seat being inclined relatively to the axis of the said enlarged portion whereby a limited movement of the said closet seat will serve to fully open the passage through the said valve seat in the direction of the said axis.

3. In combination in a water closet device, a bowl connected to the outlet pipe, a seat, a hinge connecting the said bowl and seat and having a horizontal hinge bar, a spring of bar form fixedly secured by one end, lying across the said hinge bar, and having the other end in bearing engagement with the said seat, a cock in the supply pipe controlled by a lever, a valve in the flushing connection controlled by a lever, a connecting rod interconnecting the said levers, and a lever connected by one end to the said connecting rod, lying across the said hinge bar, and having the other end in bearing engagement with the said seat.

4. In a water closet device comprising a closet seat having a tilting movement and flushing devices operated by the said seat comprising a valve casing having a valve seat and a swinging valve for coöperating therewith, and the said valve seat being inclined at an appreciable angle relatively to the direction of flow of water through the said casing, whereby a full effective opening of the valve in the direction of flow will be effected by a relatively small movement of the said closet seat.

MARTIN J. KELLY.

Witnesses:
GEORGE A. QUIGLEY,
DANIEL J. COMMANE.